US012560699B2

(12) United States Patent
Dong

(10) Patent No.: US 12,560,699 B2
(45) Date of Patent: Feb. 24, 2026

(54) METHOD AND APPARATUS OF POSITIONING BETWEEN UES, COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 491 days.

(21) Appl. No.: 18/090,076

(22) Filed: Dec. 28, 2022

(65) Prior Publication Data

US 2023/0134028 A1 May 4, 2023

Related U.S. Application Data

(63) Continuation of application No. PCT/CN2020/099676, filed on Jul. 1, 2020.

(51) Int. Cl.
*G01S 13/76* (2006.01)
*H04L 5/00* (2006.01)

(52) U.S. Cl.
CPC .......... *G01S 13/765* (2013.01); *H04L 5/0048* (2013.01); *H04L 5/0069* (2013.01)

(58) Field of Classification Search
CPC ....... G01S 13/765; G01S 5/02; H04L 5/0048; H04L 5/0069; H04L 5/0094
See application file for complete search history.

(56) References Cited

U.S. PATENT DOCUMENTS 9,462,567 B2 * 10/2016 Johnsson .............. H04W 8/005
2016/0095080 A1 3/2016 Khoryaev et al.
2019/0052322 A1 2/2019 Akkarakaran et al.
(Continued)

FOREIGN PATENT DOCUMENTS

CN 106662634 A 5/2017
CN 107113569 A 8/2017
CN 108702275 A 10/2018
(Continued)

OTHER PUBLICATIONS

State Intellectual Property Office of the People's Republic of China, Office Action and Search Report Issued in Application No. 202080001414X, Feb. 22, 2025, 17 pages.
(Continued)

*Primary Examiner* — Kabir A Timory
(74) *Attorney, Agent, or Firm* — Volpe Koenig

(57) ABSTRACT

Provided are positioning methods and apparatuses of a relative position between UEs, communication devices and storage media, a method includes: receiving relative position positioning indication sent by a core network, where the relative position positioning indication is for determining a relative position between a first UE and a second UE; and sending resource configuration based on the relative position positioning indication to the first UE and the second UE, where the resource configuration is for configuring transmission resources for one or more of the first UE and the second UE to transmit or receive one or more Uplink (UL) Sounding Reference Signals (SRSs) for sounding the relative position between the first UE and the second UE.

6 Claims, 11 Drawing Sheets

(56)                    References Cited

U.S. PATENT DOCUMENTS

2022/0321293 A1 * 10/2022 Ren ....................... H04L 5/0048
2022/0365163 A1 * 11/2022 Baek .................... H04W 56/00

FOREIGN PATENT DOCUMENTS

| CN | 111264068 | A | 6/2020 |
| CN | 111357306 | A | 6/2020 |
| WO | 2019133495 | A1 | 7/2019 |

OTHER PUBLICATIONS

ISA State Intellectual Property Office of the People's Republic of China, Written Opinion of the International Searching Authority Issued in Application No. PCT/CN2020/099676, Mar. 31, 2021, WIPO, 6 pages.
ISA State Intellectual Property Office of the People's Republic of China, International Search Report Issued in Application No. PCT/CN2020/099676, Mar. 31, 2021, WIPO, 4 pages.
Intel Corporation, "Potential RAT Dependent Techniques for NR Positioning", 3GPP TSG RAN WG1 Meeting #95, Spokane, USA, Nov. 12-16, 2018, R1-1812519, Nov. 16, 2018, 17 pages.
MediaTek Inc., "Views on potential techniques for NR positioning", 3GPP TSG-RAN WG1 Meeting #94bis, Chengdu, China, Oct. 8-Oct. 12, 2018, R1-1810461, Oct. 12, 2018, 7 pages.

* cited by examiner

METHOD AND APPARATUS OF POSITIONING BETWEEN UES, COMMUNICATION DEVICE AND STORAGE MEDIUM

CROSS-REFERENCE TO RELATED APPLICATION

The present application is a U.S. Continuation Application of International Application No. PCT/CN2020/099676 filed on Jul. 1, 2020, the contents of which are incorporated herein by reference in their entireties for all purposes.

TECHNICAL FIELD

Embodiments of the present disclosure relate to, but are not limited to, the wireless communication field, and in particular to positioning methods and apparatuses of a relative position between User Equipments (UEs), communication devices, and storage media.

BACKGROUND

Various positioning techniques are standardized in 5th Generation (5G) New Radio (NR) to implement positioning of a UE. A network can initiate positioning of the UE to obtain UE position information, and the UE can also initiate a positioning request to the network to obtain the position information of the UE itself, which indicates an absolute position of the UE. Currently, NR does not support relative positioning of UEs, which indicates a position of one UE relative to another UE, e.g., a distance between two UEs and an angular relationship between two UEs.

SUMMARY

Embodiments of the present disclosure provide positioning methods and apparatuses of a relative position between UEs, communication devices, and storage media.

According to a first aspect of the embodiments of the present disclosure, a method of positioning between user equipments (UEs) is provided, the method is performed by one or more access devices of an access network and includes: receiving relative positioning indication sent by a core network, where the relative positioning indication is for determining a relative position between a first UE and a second UE; and sending resource configuration, based on the relative positioning indication, to the first UE and the second UE respectively; where the resource configuration is for configuring transmission resources for one or more of the first UE and the second UE to transmit or receive one or more Uplink (UL) Sounding Reference Signals (SRSs), and the one or more UL SRSs are for sounding the relative position between the first UE and the second UE.

According to a second aspect of the embodiments of the present disclosure, a method of positioning between user equipments (UEs) is provided, the method is performed by a first UE and includes: receiving resource configuration sent by an access device; based on the resource configuration, measuring a second Uplink (UL) Sounding Reference Signal (SRS) transmitted by a second UE and obtaining a first measurement result; where the second UL SRS is for sounding a relative position between the first UE and the second UE, and the first measurement result is for determining the relative position between the first UE and the second UE; and determining the relative position between the first UE and the second UE at least based on the first measurement result.

According to a third aspect of the embodiments of the present disclosure, a method of positioning between user equipments (UEs) is provided, the method is performed by a second UE and includes: receiving resource configuration sent by an access device; and transmitting a second Uplink (UL) Sounding Reference Signal (SRS) to a first UE based on the resource configuration to enable the first UE to obtain a first measurement result based on the second UL SRS, where the second UL SRS is for sounding a relative position between the first UE and the second UE, and the first measurement result is for determining the relative position between the first UE and the second UE.

BRIEF DESCRIPTION OF THE DRAWINGS

The accompanying drawings are incorporated in and constitute a part of the present description, illustrate embodiments consistent with the present disclosure, and serve to explain the principles of the embodiments in the present disclosure together with the description.

DETAILED DESCRIPTION OF THE EMBODIMENTS

Figure 1:
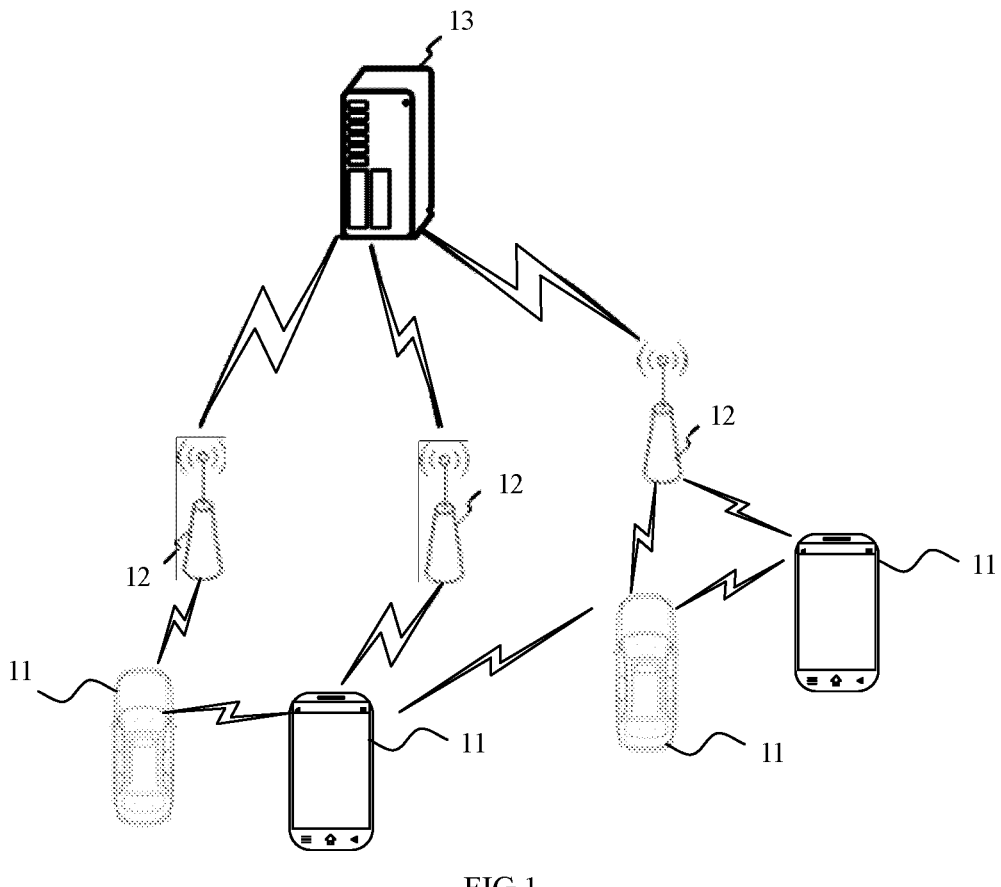
FIG. 1 is a schematic structural diagram illustrating a wireless communication system according to an embodiment.

Embodiments will be described in detail here with the examples thereof expressed in the drawings. When the following descriptions involve the drawings, like numerals in different drawings represent like or similar elements, unless stated otherwise. The embodiments described in the following examples do not represent all embodiments consistent with the present disclosure. Instead, they are merely examples of methods, apparatuses, and devices consistent with certain aspects of the disclosure, as detailed in the appended claims.

The term used in the embodiments of the present disclosure is for the purpose of describing particular examples only and is not intended to limit the embodiments of the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred to as second information; and similarly, second information may also be referred to as first information. As used herein, the term "if" and "in case" may be interpreted as "when" or "upon" or "in response to determining" depending on the context.

The technical solution provided by embodiments of the present disclosure, a base station configures resources for mutual positioning between UEs, and the UEs implement a relative position measurement between two UEs by means of UL SRS transmitting and receiving on transmission resources to which resource configuration is directed. In this way, since the transmission resources for the UEs to transmit UL SRSs are configured by the base station, reducing interference to cellular mobile communication between a UE and the base station compared to transmitting and receiving positioning sounding reference signals between two UEs, and ensuring communication quality of the cellular mobile communication.

In order to describe any embodiment of the present disclosure better, an embodiment of the present disclosure is described an application scenario of a wireless communication system.

Referring to FIG. 1, a schematic structural diagram of a wireless communication system according to an embodiment is illustrated. As shown in FIG. 1, a wireless communication system is a communication system based on cellular mobile communication technology, the wireless communication system may include: several terminals 11 and several base stations 12.

The terminals 11 may be devices providing voice and/or data connectivity to users. The terminals 11 may communicate with one or more core networks via a Radio Access Network (RAN) and may be IoT terminals such as sensor devices, mobile phones (also called cellular phones), and computers with IT terminals, for example, fixed, portable, pocket-sized, handheld, computer-built, or vehicle-mounted devices. For example, Stations (STAs), subscriber units, subscriber stations, mobile stations, mobiles, remote stations, access points, remote terminals, access terminals, user terminals, user agents, user devices, or user equipment. The terminals 11 may also be unmanned aerial vehicle devices. The terminals 11 can also be vehicle-mounted devices, for example, trip computers with wireless communication capabilities, or wireless terminals external to trip computers. The terminals 11 can be infrastructures, such as street lights, signal lights, or other infrastructures with wireless communication capabilities and the like.

The base stations 12 may be network side devices in the wireless communication system. The wireless communication system may be a fourth generation mobile communication (4G) system, also known as a Long Term Evolution (LTE) system, or the wireless communication system may be a 5G system, also known as a New Radio (NR) system or 5G NR system. Or, the wireless communication system may be a next-generation system to the 5G system. One of the access networks in the 5G system can be known as the NG-RAN (New Generation-Radio Access Network).

The base stations 12 can be evolved base stations (eNBs) as adopted in 4G systems. The base stations 12 can also be base stations (gNBs) in a 5G system with a centralized and distributed architecture. When the base stations 12 adopt the centralized and distributed architecture, a central unit (CU) and at least two distributed units (DUs) are usually included. A Packet Data Convergence Protocol (PDCP) layer, a Radio Link Control (RLC) layer, and a Media Access Control (MAC) layer protocol stack are provided in the central unit; a PHYsical (PHY) layer protocol stack is provided in the distributed unit, and embodiments of the present disclosure do not limit the specific implementation of the base stations 12.

The base stations 12 and the terminals 11 can be connected to each other via wireless air interfaces. In different implementations, the wireless air interfaces may be wireless air interfaces based on the fourth generation mobile communication network technology (4G) standard; or, the wireless air interfaces may be wireless air interfaces based on the fifth generation mobile communication network technology (5G) standard. For example, the wireless air interfaces may adopt New Radio; or, the wireless air interfaces may also be wireless air interfaces based on the next generation mobile communication network technology standard of 5G.

In some embodiments, the above wireless communication system may also include network management devices 13.

Several base stations 12 are connected to the network management devices 13 respectively. The network management devices 13 may be core network devices in the wireless communication system, for example, the network management devices 13 may be Mobility Management Entities (MME) in an Evolved Packet Core (EPC) network. Or, the network management devices may also be other core network devices such as Serving GateWays (SGWs), Public Data Network GateWays (PGWs), Policy and Charging Rules Function (PCRF) units, Home Subscriber Servers (HSSs) and the like. The embodiments of the present disclosure do not limit the form in which the network management devices 13 can be implemented.

Figure 2A:
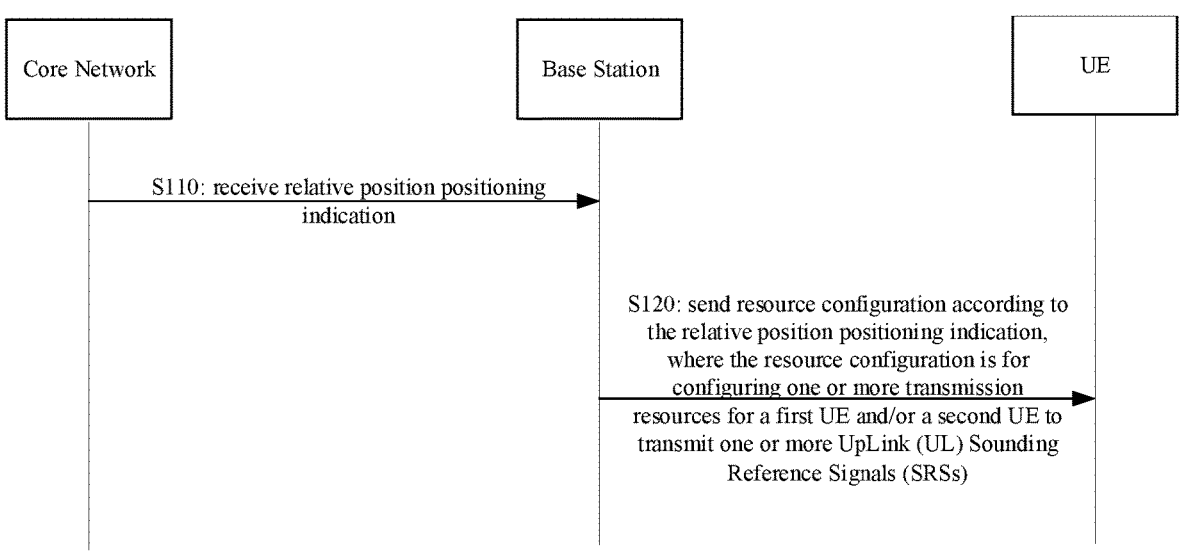
FIG. 2A is a flowchart diagram illustrating a method of positioning between UEs according to an embodiment.

As shown in FIG. 2A, embodiments of the present disclosure provide a method of positioning between user equipments (UEs), where the method may be performed by one or more access devices (e.g., one or more base stations) of an access network, and the method may include steps S110 and S120 as follows.

At step S110, a relative positioning indication sent by a core network is received, where the relative positioning indication is for determining a relative position between a first UE and a second UE.

At step S120, according to the relative positioning indication, resource configuration is sent to the first UE and the second UE, where the resource configuration is for configuring one or more transmission resources for the first UE and/or the second UE to transmit or receive one or more UpLink (UL) Sounding Reference Signals (SRSs), and the one or more UL SRSs are for sounding a relative position between the first UE and the second UE.

For example, if only the first UE is configured with a transmission resource for transmitting a UL SRS, the second UE may obtain a second measurement result by measuring the UL SRS transmitted by the first UE on the configured transmission resource, and the second measurement result can be used by the second UE to determine a relative position between the second UE and the first UE. If the first UE requests to know the relative position between the first UE and the second UE, the second UE can report the relative position measured by the second UE to an access device, and then the access device transmits the relative position to the first UE.

For another example, if only the second UE is configured with a transmission resource for transmitting a UL SRS, the first UE may obtain a first measurement result by measuring the UL SRS transmitted by the second UE on the configured transmission resource, and the first measurement result can be used by the first UE to determine a relative position between the first UE and the second UE. If the second UE requests to know the relative position between the second UE and the first UE, the first UE can report the relative position measured by the first UE to an access device, and then the access device transmits the relative position to the second UE.

Figure 2B:
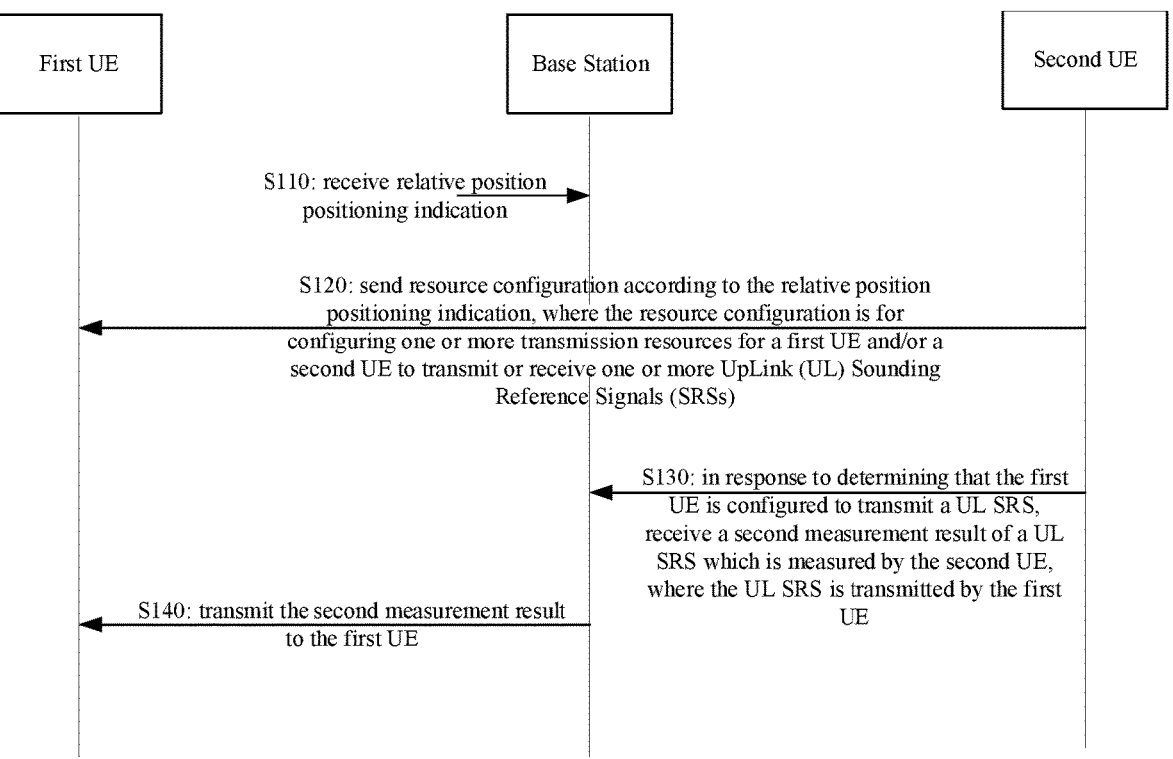
FIG. 2B is a flowchart diagram illustrating a method of positioning between UEs according to an embodiment.

In an embodiment as shown in FIG. 2B, the access device configures transmission resources for the first UE and the second UE to transmit or receive UL SRSs, respectively, where the method may further include steps S130 and S140 as follows.

At step S130, in response to determining that the first UE is configured to transmit a UL SRS, a second measurement result of a UL SRS, which is measured by the second UE, is received, where the UL SRS is transmitted by the first UE.

At step S140, the second measurement result is transmitted to the first UE, where the second measurement result is for determining the relative position between the first UE and the second UE.

UEs may position each other, but when positioning between the UEs is performed via a sidelink between devices, the UEs are expected to support sidelink communication interfaces, which increases the complexity of the UEs. In embodiments of the present disclosure, two UEs that need to position each other implement a relative positioning between the UEs using an uplink Uu interface based on positioning measurement resources allocated by an access device.

For example, the two UEs may be located in one cell or in adjacent cells, or in two cells that are not adjacent to each other.

The method can be applied to a base station group, which may include one base station or multiple base stations. For example, if the two UEs to be positioned are located in a same cell, the base station is the base station where the two UEs are camped or connected. If the two UEs are located in different cells, the base station group may include: two base stations.

The above are only examples of performing subjects of the method of positioning between UEs, and in specific implementations, the method of positioning between UEs may be applied in one or more access devices of an access network. The base station is one of the access devices.

In the embodiments of the present disclosure, the access device participates in a resource allocation for mutual positioning measurement of the first UE and the second UE, which reduces a phenomenon of poor wireless environment caused by the first UE and the second UE randomly selecting resources to transmit positioning sounding reference signals and a phenomenon of interference with normal communications of other UEs, and improves overall communication quality of a cellular cell.

In the embodiments of the present disclosure, the resources allocated by the access device side for the first UE and the second UE may both be UL SRS resources, so that the first UE and the second UE may transmit or receive UL SRSs on the UL SRS resources according to the resource allocation and measure UL SRSs transmitted by the opposite UE, thus enabling a relative position measurement between the first UE and the second UE through a signal measurement.

The relative position between the UEs here may include: a relative distance and a relative angle between the first UE and the second UE.

In the embodiments of the present disclosure, the first UE and the second UE reuse UL SRSs originally used for uplink positioning between the access device and the UEs to perform relative positioning between the two UEs, which can be compatible with cellular communication technologies in related technologies to some extent and has a feature of easy operation.

The first measurement result and the second measurement result may include at least one of: a receiving and transmitting time difference (RX-TX time difference); Reference Signal Receiving Power (RSRP) of a received SRS; Reference Signal Receiving Quality (RSRQ) of the received SRS; or an Angle of Arrival (AOA) of the received SRS.

After any of the first UE and the second UE receive the UL SRS transmitted by the other UE, the relative position between the first UE and the second UE can be calculated based on the measurement result of itself.

In the embodiments of the present disclosure, the first UE may be an initializing UE that initiates the relative position measurement between UEs, or may be a target UE that participates in the relative position measurement between UEs. Or, the second UE may be an initializing UE that initiates the relative position measurement between UEs, or may be a target UE that participates in the relative position measurement between UEs. In summary, one of the first UE and the second UE is the initializing UE, the other is the target UE.

In some embodiments, after either of the first UE and the second UE receives a measurement result transmitted by the other UE, the relative position between the first UE and the second UE can be calculated based on the measurement result that is received.

For example, after receiving the second measurement result from the second UE, the access device may transmit the second measurement result to the first UE for the calculation of the relative position between the first UE and the second UE, so that the positioning measurement between UEs is easily implemented with less possible interference to the cellular communication.

In some embodiments, the relative positioning indication includes identification information of the first UE, identification information of the second UE, and a relative position measurement indication.

The relative positioning indication can be sent by a network element of a core network. The network element of the core network includes but is not limited to: Access Management Function (AMF) or Location Management Function (LMF).

The relative positioning indication may be obtained based on a request transmitted by the initializing UE to perform positioning between UEs. For example, the AMF or LMF transmits the relative positioning indication to the access device after receiving the positioning request transmitted by the initializing UE.

The AMF or LMF may carry the identification information of the first UE and the second UE in the relative positioning indication, and also carry the relative position measurement indication. Based on this, the access device, after receiving the relative positioning indication, can know that the relative positioning indication is for positioning the relative position between two UEs instead of a relative position between a UE and the access device, compared to relative positioning indication carrying only the identification information of one UE.

The relative position measurement indication, indicating that the indication is a request to perform relative positioning. After receiving the relative positioning indication, the access device may carry out resource allocation for positioning according to the indication and transmit configuration of allocated resources to facilitate the transmitting and/or receiving of positioning sounding reference signals for positioning measurement between UEs.

Figure 3:
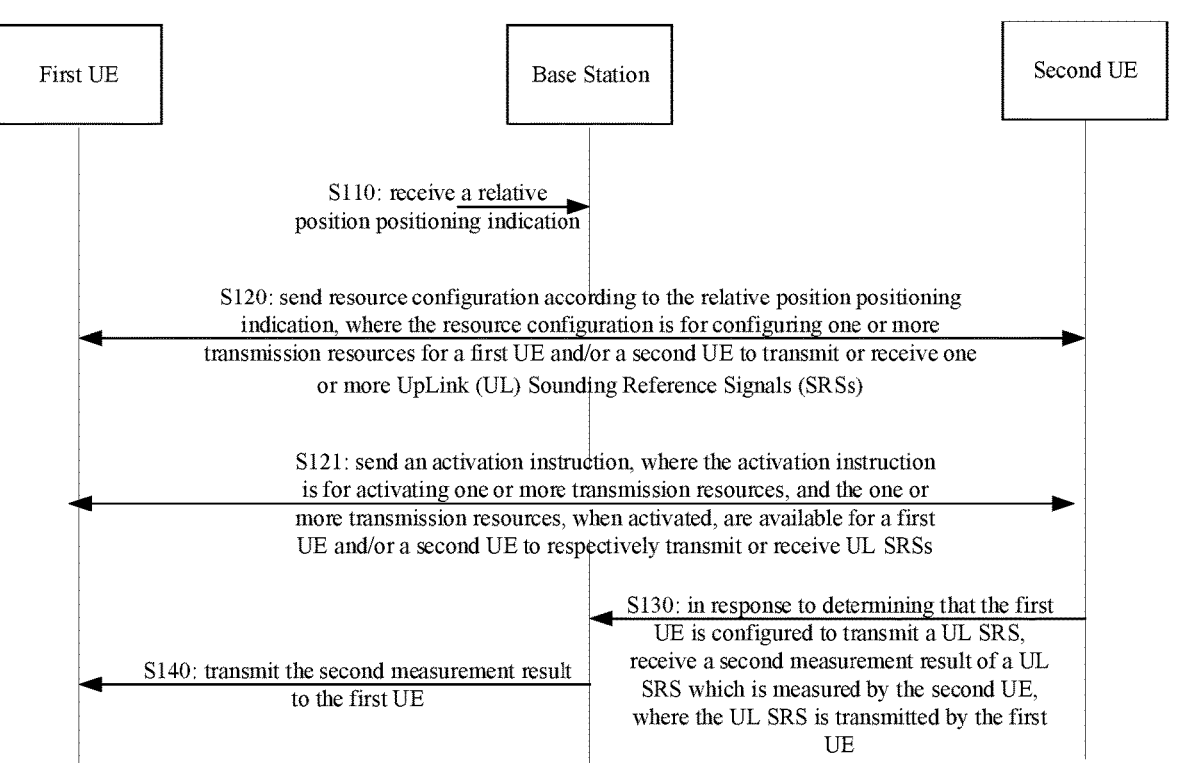
FIG. 3 is a flowchart diagram illustrating a method of positioning between UEs according to an embodiment.

In some embodiments, as shown in FIG. 3, the method may further include step S121, which is performed between previously described steps S120 and S130.

At step S121, an activation instruction is sent, where the activation instruction is for activating one or more transmission resources, and the one or more transmission resources, when activated, are available for a first UE and/or a second UE to respectively transmit or receive UL SRSs.

In some embodiments, after the resource configuration is sent, the resources are merely pre-configured and need to be activated by activation instructions for specific use.

The activation instruction includes, but is not limited to, Downlink Control Information (DCI). In other embodiments, the activation instructions described may also be Radio Resource Control (RRC) signaling and/or MAC Control Element (CE).

In this way, the access device, in response to determining that the UL SRS is not for uplink positioning or the UE has no uplink data to transmit, sends the activation instruction to activate the transmission resources for mutual positioning between the UEs, so that a resource conflict in a process of resource using can be resolved cleverly.

In some embodiments, the resource configuration includes: first configuration for the first UE to transmit a UL SRS and/or second configuration for the second UE to transmit a UL SRS.

Sending the resource configuration based on the relative positioning indication includes: in response to determining that only the first UE is configured to transmit a UL SRS, sending the first configuration to the first UE and the second UE; in response to determining that only the second UE is configured to transmit a UL SRS, sending the second configuration to the first UE and the second UE; and in response to determining that both the first UE and the second UE are configured to transmit UL SRSs, sending both the first configuration and the second configuration to the first UE and the second UE.

In the above embodiment, the first UE is expected to measure the UL SRS transmitted by the second UE. Similarly, the second UE is also expected to measure the UL SRS transmitted by the first UE. Accordingly, in response to determining that only the first UE is configured to transmit a UL SRS, the access device, when sending the resource configuration, not only sends first resource configuration to the first UE for transmitting a UL SRS, but also sends the first resource configuration to the second UE to facilitate the second UE to receive the UL SRS transmitted by the first UE on the transmission resource where the first UE transmits the UL SRS. Similarly, in response to determining that only the second UE is configured to transmit a UL SRS, the access device, when sending the resource configuration, not only sends second resource configuration to the second UE for transmitting a UL SRS, but also sends the second resource configuration to the first UE to facilitate the first UE to receive the UL SRS transmitted by the second UE on the transmission resource where the second UE transmits the UL SRS. In response to determining that both the first UE and the second UE are configured to transmit UL SRSs, both the first configuration and the second configuration are sent to both the first UE and the second UE.

In some embodiments, the identification information of the first UE and the second UE may be carried while the access device is transmitting the resource configuration to distinguish the transmission resources of the first UE and the second UE for transmitting UL SRSs respectively in the resource configuration.

The resource configuration of the first UE and the second UE to transmit UL SRSs can be sent in one piece of signaling or in different pieces of signaling. The specific way to send the resource configuration can be specified by a communication protocol or pre-negotiation between the UEs and the access device, and will not be further limited here.

Figure 4A:
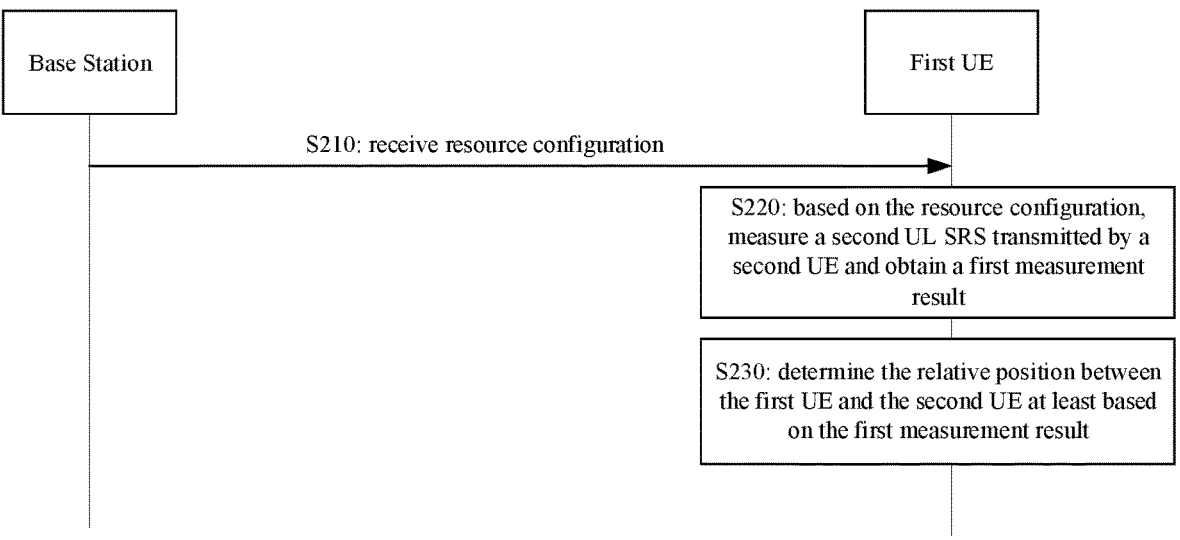
FIG. 4A is a flowchart diagram illustrating a method of positioning between UEs according to an embodiment.

As shown in FIG. 4A, the embodiments of the present disclosure provide a method of positioning between UEs, the method is performed by a first UE, the method may include steps S210, S220, and S230 as follows.

At step S210, the resource configuration sent by an access device is received.

At step S220, based on the resource configuration, a second ULSRS transmitted by a second UE is measured, and a first measurement result is obtained. The second UL SRS is for sounding a relative position between the first UE and the second UE, and the first measurement result is for determining the relative position between the first UE and the second UE.

At step S230, the relative position between the first UE and the second UE is determined at least based on the first measurement result.

In an embodiment, the first UE may be able to estimate the relative position between itself and the second UE based only on the first measurement result.

Figure 4B:
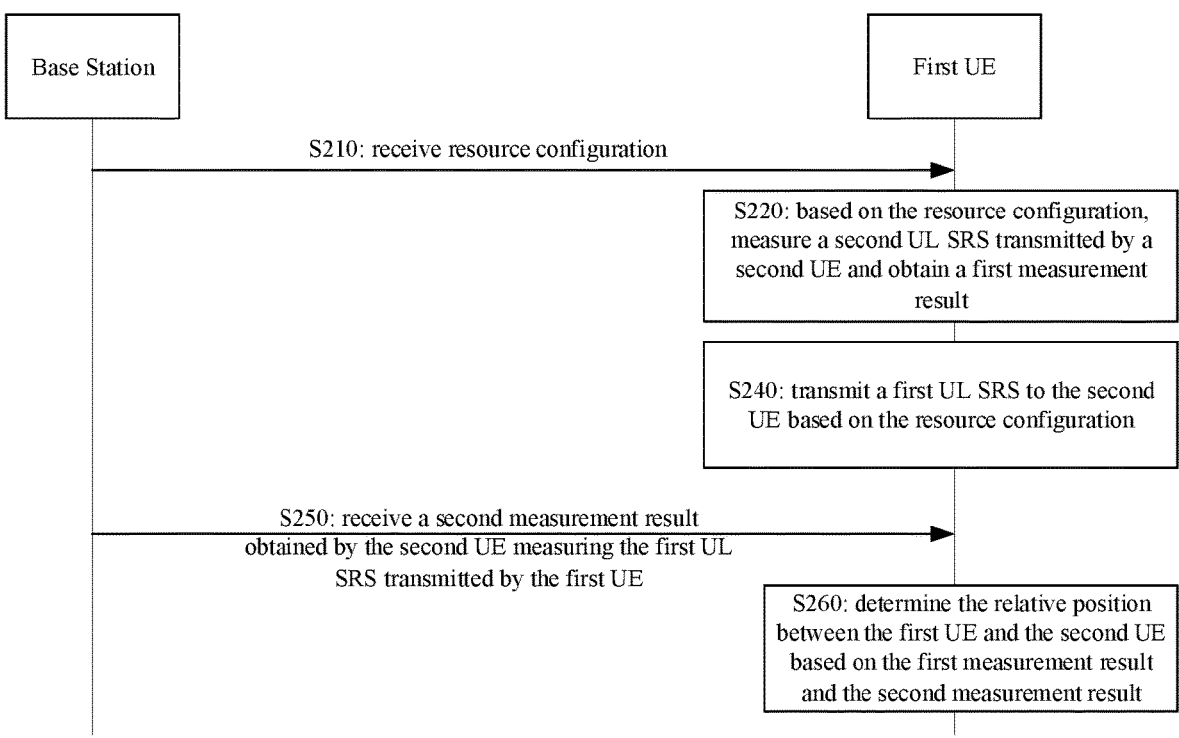
FIG. 4B is a flowchart diagram illustrating a method of positioning between UEs according to an embodiment.

In another embodiment, as shown in FIG. 4B, the method may further include steps S240, S250, and S260 as follows.

At step S240, a first UL SRS is transmitted to the second UE based on the resource configuration.

At step S250, a second measurement result obtained by the second UE measuring the first UL SRS transmitted by the first UE is received from the access device.

At step S260, a relative position between the first UE and the second UE is determined based on the first measurement result and the second measurement result.

In this way, the first UE may receive the second measurement result of the second UE, so that the first UE may determine, based on the first measurement result and/or the second measurement result, the relative position between the first UE and the second UE. The method for determining the relative position between the first UE and the second UE based on both the first measurement result and the second measurement result may be more accurate and more precise than determining the relative position between the first UE and the second UE based on a single first measurement result or a single second measurement result.

The positioning method is applied to the first UE, the first UE may be an initializing UE or a target UE performing relative positioning between UEs.

After receiving the resource configuration, the first UE may, based on the resource configuration, transmit a first UL SRS, measure a second UL SRS of the second UE, and obtain the first measurement result, where the first measurement result may include the aforementioned RX-TX time difference, AOA, SRS-RSRQ/RSRP.

For example, the second UE transmits the second UL SRS based on the resource configuration, so that the first UE can determine transmitting time of the second UL SRS transmitted by the second UE based on the resource configuration, and determine the receiving time of the second UL SRS sent by the second UE based on its own reception, and then calculate the transmitting and receiving time difference easily.

For another example, the second UL SRS transmitted by the second UE may carry a precise transmitting time, so that the first UE can precisely calculate the transmitting and receiving time difference based on the receiving time of the second UL SRS received by it from the second UE.

The second UE's measurement of the first UL SRS transmitted by the first UE is similar to the first UE's measurement of the second UL SRS transmitted by the second UE, and will not be repeated here.

Based on the first measurement and/or the second measurement result of the first UE by the second UE, the relative position between the first UE and the second UE can be determined by the first UE.

The measurement of the relative position between the first UE and the second UE is performed in this way, avoiding the poor wireless environment caused by the direct transmission of the positioning sounding reference signal for positioning measurement out of the resource allocation of the access device, or reducing the phenomenon of interference with cellular communication.

In some embodiments, the resource configuration includes: first configuration for the first UE to transmit the first UL SRS and/or second configuration for the first UE to receive the second UL SRS transmitted by the second UE.

The step S210 includes receiving the first configuration and/or the second configuration.

In some embodiments, transmitting a UL SRS based on the resource configuration includes: transmitting a first UL SRS based on the first configuration.

Based on the resource configuration, receiving the second UL SRS transmitted by the second UE and obtaining the first measurement result includes: based on the second configuration, receiving the second UL SRS transmitted by the second UE and obtaining the first measurement result.

The resource configuration received by the first UE includes the resource configuration for each of the two UEs to transmit or receive a UL SRS, respectively, (e.g., the first configuration and the second configuration), so that the first UE can perform a signal measurement based on the resource configuration and further perform positioning.

In some embodiments, the method may further include: receiving an activation instruction from the access device; based on the activation instruction, activating a transmission resource corresponding to the resource configuration; and receiving the second UL SRS transmitted by the second UE on the transmission resource that is activated.

In some embodiments, the method may further include: receiving an activation instruction from the access device;

based on the activation instruction, activating a transmission resource corresponding to the resource configuration; and transmitting the first UL SRS to the second UE on the transmission resource that is activated.

The activation instruction can be DCI or RRC signaling or MAC CE, so that the UL SRS is transmitted or received on the activated transmission resource according to the activation instruction, which reduces a conflict of UL SRS resource reusing.

In some embodiments, the method may further include: transmitting a request message to a core network, where the request message is for requesting a measurement of the relative position between the first UE and the second UE, to trigger the core network to send relative position indication to the access device of an access network for triggering the access device to send the resource configuration.

For example, the first UE transmits the request message to the core network through the access device, specifically to the Access Management Function (AMF) or the Location Management Function (LMF) of the core network.

For example, the first UE transmits an LTE Positioning Protocol (LPP) message or a NAS (Non-Access Stratum) message to the core network. The LPP message or NAS message carries the request message.

The request message is for requesting to measure the relative position between the first UE and the second UE.

After receiving the request message, the core network may transmit the relative positioning indication to the base station, where the relative positioning indication may carry the request message directly, or the message content of the request message may be extracted and re-encapsulated into the relative positioning indication.

Figure 5A:
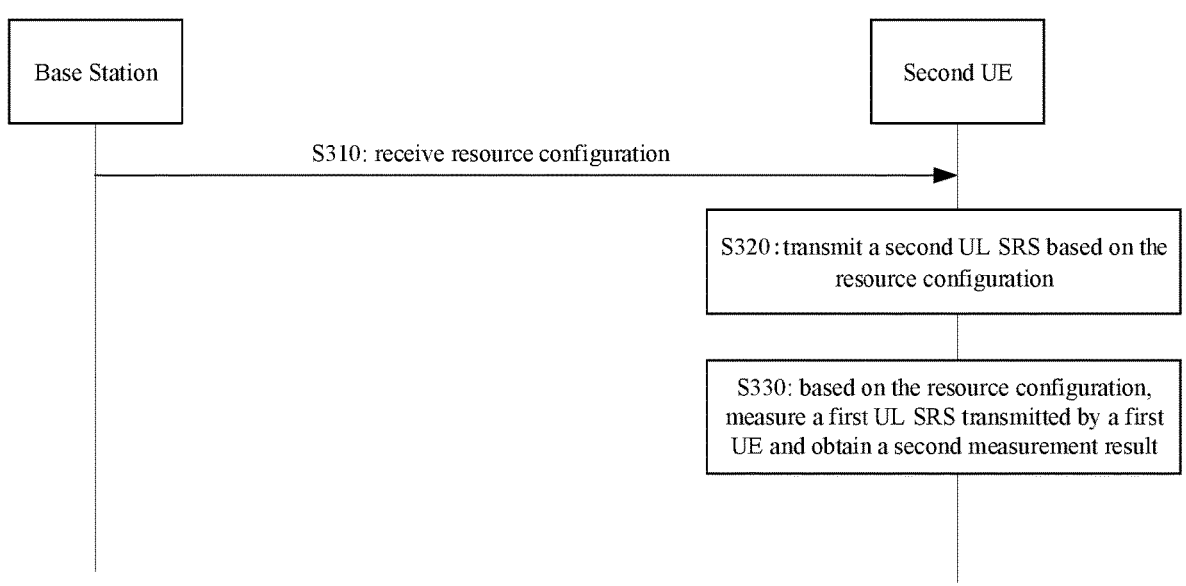
FIG. 5A is a flowchart diagram illustrating a method of positioning between UEs according to an embodiment.

As shown in FIG. 5A, the embodiments of the present disclosure provide a method of positioning between UEs, the method is performed by a second UE, the method may include steps S310, S320, and S330 as follows.

At step S310, the resource configuration sent by an access device is received.

At step S320, a second UL SRS is transmitted to a first UE based on the resource configuration to enable the first UE to obtain a first measurement result based on the second UL SRS, where the second UL SRS is for sounding a relative position between the second UE and the first UE, and the first measurement result is for determining the relative position between the first UE and the second UE.

At step S330, based on the resource configuration, a first UL SRS transmitted by the first UE is measured, and a second measurement result is obtained, where the second measurement result is for further determining the relative position between the first UE and the second UE.

Figure 5B:
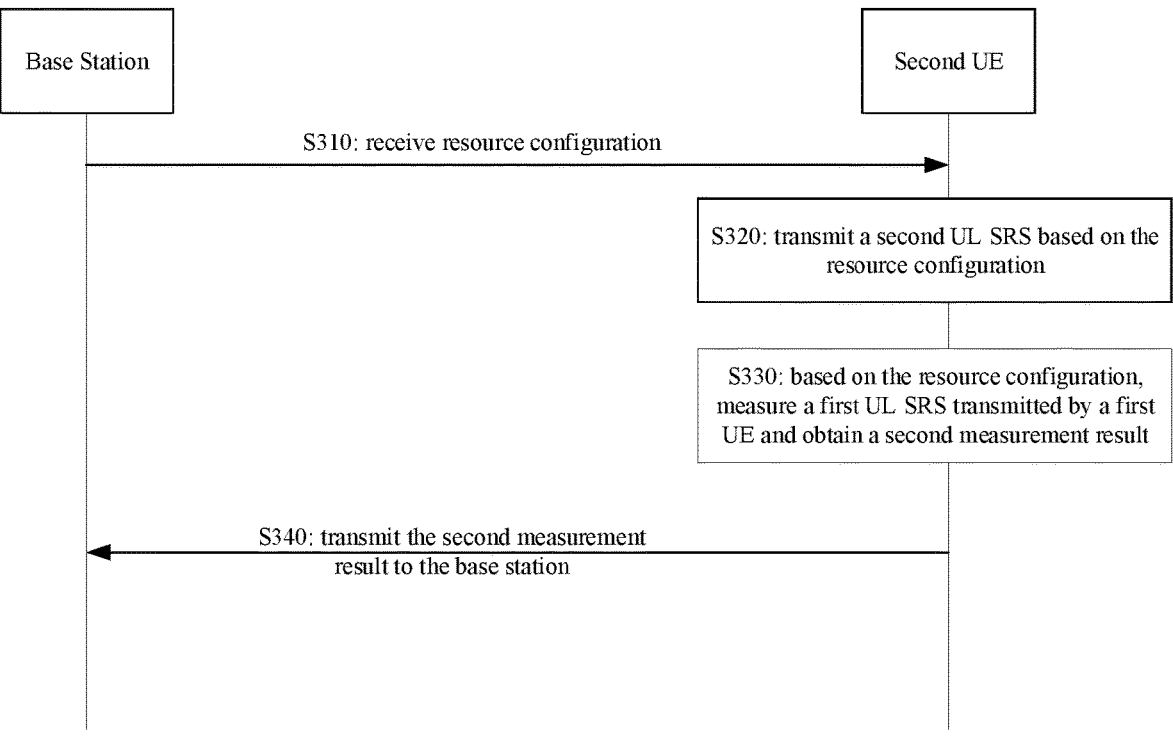
FIG. 5B is a flowchart diagram illustrating a method of positioning between UEs according to an embodiment.

In another embodiment, as shown in FIG. 5B, the method may further include step S340 as follows.

At step S340, the second measurement result is transmitted to the access device, where the second measurement result is transmitted through the access device to the first UE, after the second measurement result is transmitted to the first UE through the access device, the relative position between the first UE and the second UE is determined at least based on the second measurement result.

In some embodiments, the resource configuration includes first configuration for the second UE to receive a first UL SRS transmitted by the first UE and/or second configuration for the second UE to transmit the second UL SRS.

Receiving the resource configuration includes: receiving the first configuration and/or the second configuration.

Transmitting the UL SRS based on the resource configuration includes: transmitting the second UL SRS based on the second configuration. Measuring the first UL SRS transmitted by the first UE and obtaining a second measurement result based on the resource configuration includes: based on the first configuration, receiving the first UL SRS transmitted by the first UE and obtaining the second measurement result.

In the embodiments of the present disclosure, the first UE transmits the first UL SRS based on the first configuration, and based on the second configuration, receives the second UL SRS transmitted by the second UE and obtains the first measurement result. The second UE transmits the second UL SRS based on the second configuration, and based on the first configuration, receives the first UL SRS transmitted by the first UE and obtains the second measurement result.

In some embodiments, the method may further include: receiving an activation instruction from the access device; based on the activation instruction, activating a transmission resource corresponding to the resource configuration; and transmitting the second UL SRS to the first UE on the transmission resource that is activated.

In some embodiments, the method may further include: receiving an activation instruction from the access device; based on the activation instruction, activating a transmission resource corresponding to the resource configuration; and receiving the first UL SRS transmitted by the first UE on the transmission resource that is activated.

After the transmission resource indicated by the resource configuration is activated according to the activation instruction, the first UE and/or the second UE may transmit and receive the UL SRSs, so as to obtain the first measurement result and/or the second measurement result, and may receive a measurement result of the other UE from an access device, thereby completing the measurement of the relative position between the first UE and the second UE in a simple manner.

Figure 6:
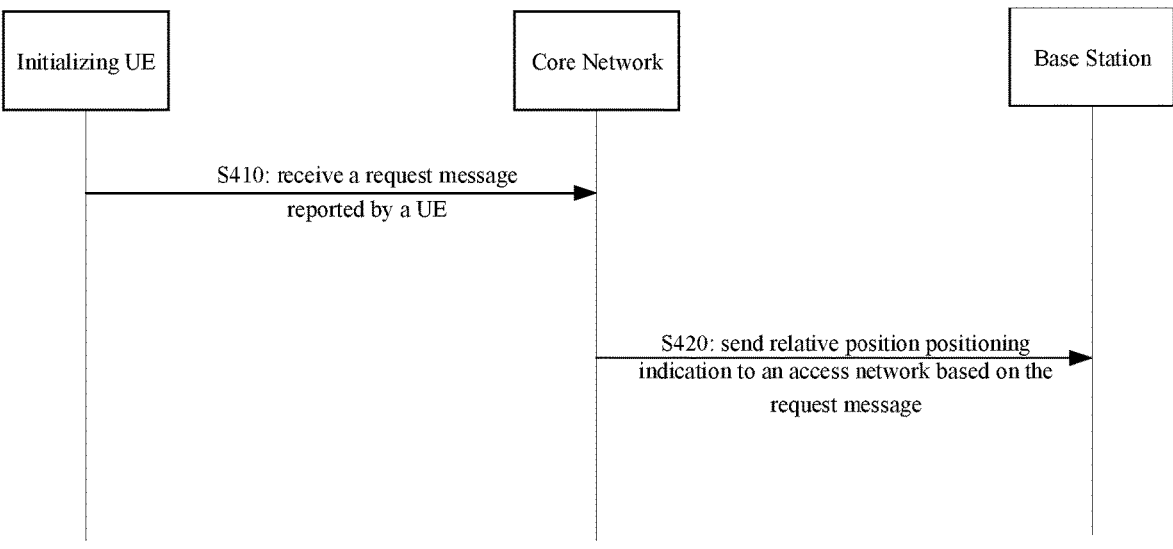
FIG. 6 is a flowchart diagram illustrating a method of positioning between UEs according to an embodiment.

As shown in FIG. 6, the embodiments of the present disclosure provide a method of positioning between UEs, the method may include steps S410 and S420 as follows.

At step S410, a request message reported by a UE is received.

At step S420, a relative positioning indication is sent to one or more access devices of an access network based on the request message.

The relative positioning indication is for triggering the one or more access devices to configure a transmission resource for a first UE and/or a second UE to transmit one or more UL SRSs. The one or more UL SRSs are for sounding a relative position between the first UE and the second UE.

The embodiments of the present disclosure can be applied to a core network, for example, to an AMF or LMF of the core network.

After receiving the request message reported by the UE, relative positioning indication for triggering the one or more access devices to provide the first UE and the second UE with resources for a relative position measurement between the UEs is transmitted to the one or more access devices, enabling the first UE and the second UE to perform the relative position measurement with the transmission resources configured by the one or more access devices, so as to reduce resource interference to a cellular communication.

In some embodiments, the request message includes identification information of the first UE, identification information of the second UE, and a relative position measurement instruction.

The relative positioning indication includes the identification information of the first UE, the identification information of the second UE, and the relative position measurement instruction.

By carrying the identification information of the first UE and the second UE and the relative position measurement instruction in the relative positioning indication, the one or more access devices can be enabled to know for which UEs the transmission resources for transmitting UL SRS are to be configured, to perform the relative position measurement between UEs.

Figure 7:
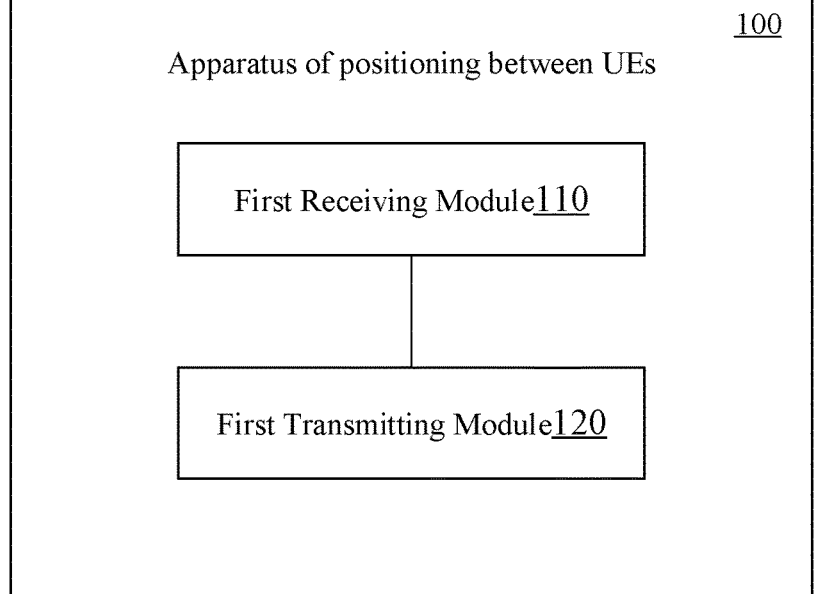
FIG. 7 is a schematic structural diagram illustrating an apparatus of positioning between UEs according to an embodiment.

As shown in FIG. 7, the embodiments of the present disclosure provide an apparatus 100 of positioning between UEs, the apparatus 100 may include a first receiving module 110 and a first transmitting module 120.

The first receiving module 110, configured to receive relative position, is configured to receive relative positioning indication.

The first transmitting module 120 configured to respectively send resource configuration to the first UE and the second UE, based on the relative positioning indication; where the resource configuration is for configuring transmission resources for the first UE and/or the second UE to transmit uplink (UL) sounding reference signals (SRSs).

The first receiving module 110, further configured to receive a second measurement result of UL SRS transmitted by the first UE from the second UE; and/or, the first receiving module 110, further configured to transmit the second measurement result to the first UE; where the second measurement result is for determining, based on the second measurement result and a first measurement result of the UL SRS transmitted by the second UE which is measured by the first UE, the relative position between the first UE and the second UE.

In some embodiments, the first transmitting module 120 and the first receiving module 110 may be program modules, when executed by at least one processor, can implement the aforementioned transmitting and receiving operations.

In other embodiments, the first transmitting module 120 and the first receiving module 110 may be a combination of hard and soft modules, which includes, but is not limited to, a programmable array. The programmable array includes, but is not limited to, a field programmable array or a complex programmable array.

In some other embodiments, the first transmitting module 120 and the first receiving module 110 may be hardware-only modules. The hardware-only modules include, but are not limited to: specialized integrated circuits.

In some embodiments, the relative positioning indication includes identification information of the first UE, identification information of the second UE, and a relative position measurement indication.

In some embodiments, the first transmitting module 120 is configured to send an activation instruction. Where the activation instruction is for activating the transmission resources; the transmission resources, after being activated, are for the first UE and/or the second UE to respectively transmit uplink (UL) sounding reference signals (SRSs).

In some embodiments, the resource configuration includes: a first configuration for the first UE to transmit a UL SRS and/or a second configuration for the second UE to transmit a UL SRS.

The first transmitting module 120, configured to transmit the first configuration and the second configuration to the first UE; and to transmit the first configuration and the second configuration to the second UE.

Figure 8:
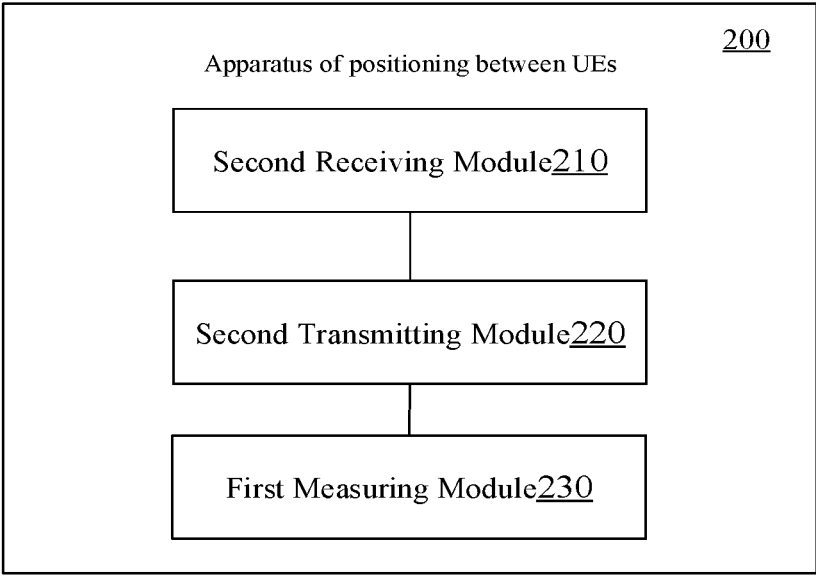
FIG. 8 is a schematic structural diagram illustrating an apparatus of positioning between UEs according to an embodiment.

As shown in FIG. 8, the embodiments of the present disclosure provide an apparatus 200 of positioning between User Equipment (UEs) applied to a first UE, including: a second receiving module 210, a second transmitting module 220, and a first measuring module 230.

The second receiving module 210, configured to receive resource configuration.

The second transmitting module 220, configured to transmit a UL SRS based on the resource configuration.

The first measuring module 230, configured to, based on the resource configuration, measure a UL SRS transmitted by a second UE and obtain a first measurement result; the first measurement result is for determining a relative position between the first UE and the second UE.

In another embodiment, the second receiving module 210 is configured to receive a second measurement result obtained by the second UE measuring the UL SRS transmitted by the first UE; the apparatus 200 may further include a determining module (not shown).

The determining module, configured to determine the relative position between the first UE and the second UE, based on the first measurement result and the second measurement result.

In some embodiments, the second transmitting module 220, the second receiving module 210 and the first measuring module 230 may be program modules, when executed by at least one processor, can implement the aforementioned operations.

In other embodiments, the second transmitting module 220, the second receiving module 210, and the first measuring module 230 may be a combination of soft and hard modules, which includes, but is not limited to, a programmable array. The programmable array includes, but is not limited to, a field programmable array or a complex programmable array.

In other embodiments, the second transmitting module 220, the second receiving module 210, and the first measuring module 230 may be hardware-only modules. The hardware-only modules include, but are not limited to: specialized integrated circuits.

In some embodiments, the resource configuration includes: a first configuration for the first UE to transmit a UL SRS and/or a second configuration for the second UE to transmit a UL SRS.

The second receiving module 210 is configured to receive the first configuration and/or the second configuration.

The second transmitting module 220 is configured to transmit the UL SRS based on the first configuration; and/or, the first measuring module 230 is configured to, based on the second configuration, receive the UL SRS transmitted by the second UE and obtain the first measurement result.

In some embodiments, the second receiving module 210 is further configured to receive an activation instruction.

The apparatus 200 may further include: an activating module (not shown), configured to activate transmission resources corresponding to the resource configuration based on the activation instruction; where the UL SRSs are transmitted on the transmission resources that are activated.

In some embodiments, the second transmitting module 220 is further configured to transmit a request message to a core network, where the request message is for requesting a measurement of the relative position between the first UE and the second UE, and trigger the core network to send relative positioning indication to an access network triggering the access network to send the resource configuration.

Figure 9:
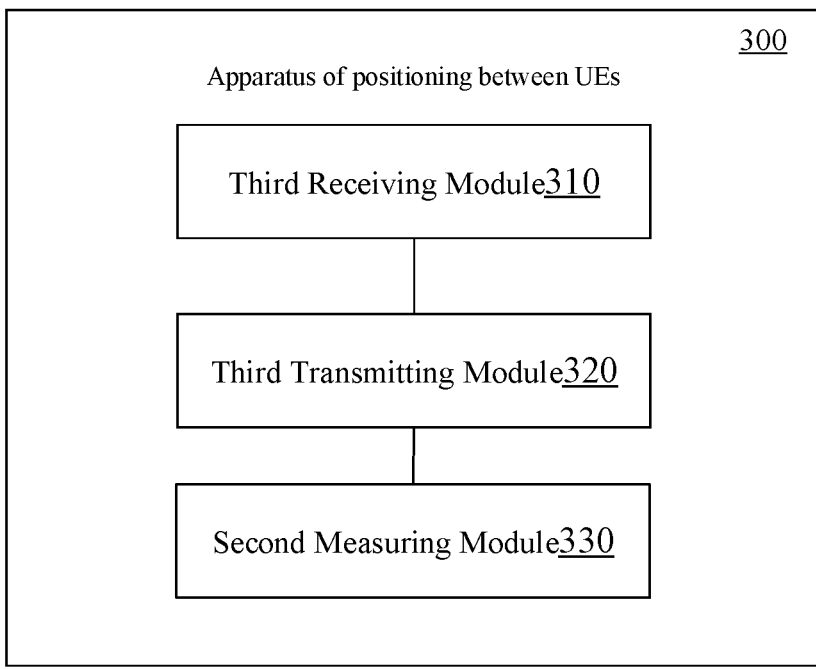
FIG. 9 is a schematic structural diagram illustrating an apparatus of positioning between UEs according to an embodiment.

As shown in FIG. 9, the embodiments of the present disclosure provide an apparatus 300 of positioning between UEs applied to a second UE, the apparatus 300 may include a third receiving module 310, a third transmitting module 320, and a second measuring module 330.

The third receiving module 310, configured to receive resource configuration.

The third transmitting module 320, configured to transmit a UL SRS based on the resource configuration.

The second measuring module 330, configured to, based on the resource configuration, measure a UL SRS transmitted by a first UE and obtain a second measurement result; the second measurement result is for determining a relative position between the first UE and the second UE.

In other embodiments, the third transmitting module 320 is further configured to transmit the second measurement result to a base station; where the second measurement result, after being transmitted by the base station to the first UE, is for determining the relative position between the first UE and the second UE based on the second measurement result and the first measurement result obtained by the first UE measuring the UL SRS transmitted by the second UE.

In some embodiments, the third transmitting module 320, the third receiving module 310 and the second measuring module 330 may be program modules, when executed by at least one processor, can implement the aforementioned operations.

In other embodiments, the third transmitting module 320, the third receiving module 310 and the second measuring module 330 may be a combination of soft and hard modules, which includes, but is not limited to, a programmable array. The programmable array includes, but is not limited to, a field programmable array or a complex programmable array.

In other embodiments, the third transmitting module 320, the third receiving module 310 and the second measuring module 330 may be hardware-only modules. The hardware-only modules include, but are not limited to: specialized integrated circuits.

In some embodiments, the resource configuration includes: a first configuration for the first UE to transmit a UL SRS and/or a second configuration for the second UE to transmit a UL SRS.

The third receiving module 310 is configured to receive the first configuration and/or the second configuration.

Thus, the third transmitting module 320 is configured to transmit the UL SRS based on the second configuration; and/or, the second measuring module 330 is configured to, based on the first configuration, receive the UL SRS transmitted by the first UE and obtain the second measurement result.

In some embodiments, the third receiving module 310 is further configured to receive an activation instruction.

The apparatus 300 may further include a second activating module (not shown), configured to activate transmission resources corresponding to the resource configuration based on the activation instruction; where the UL SRSs are transmitted on the transmission resources that are activated.

Figure 10:
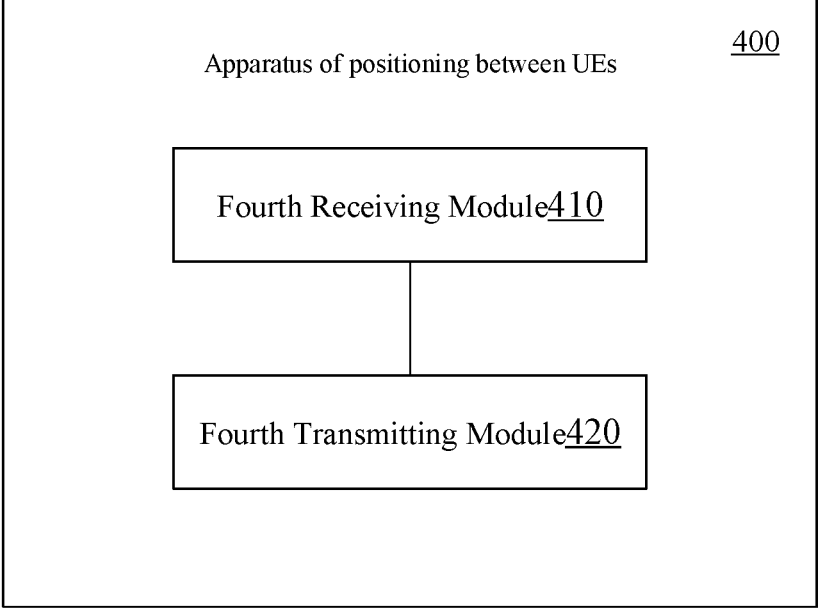
FIG. 10 is a schematic structural diagram illustrating an apparatus of positioning between UEs according to an embodiment.

As shown in FIG. 10, the embodiments of the present disclosure provide an apparatus 400 of positioning between UEs, the apparatus 400 may include a fourth receiving module 410 and a fourth transmitting module 420.

The fourth receiving module 410 is configured to receive a request message reported by a UE.

The fourth transmitting module 420 is configured to send relative positioning indication to an access network based on the request message.

Where the relative positioning indication is for triggering a base station to configure a transmission resource for a first UE and/or a second UE to transmit UL SRSs, where the UL SRSs are for determining a relative position between the first UE and the second UE.

In some embodiments, the fourth transmitting module 420 and the fourth receiving module 410 may be program modules, when executed by at least one processor, can implement the aforementioned transmitting and receiving operations.

In other embodiments, the fourth transmitting module 420 and the fourth receiving module 410 may be a combination of hard and soft modules, which includes, but is not limited to a programmable array. The programmable array includes, but is not limited to a field programmable array or a complex programmable array.

In some other embodiments, the fourth transmitting module 420 and the fourth receiving module 410 may be hardware-only modules. The hardware-only modules include, but are not limited to: specialized integrated circuits.

In some embodiments, the request message includes identification information of the first UE, identification information of the second UE and a relative position measurement instruction.

Where the relative positioning indication includes the identification information of the first UE, the identification information of the second UE, and the relative position measurement instruction.

Figure 11:
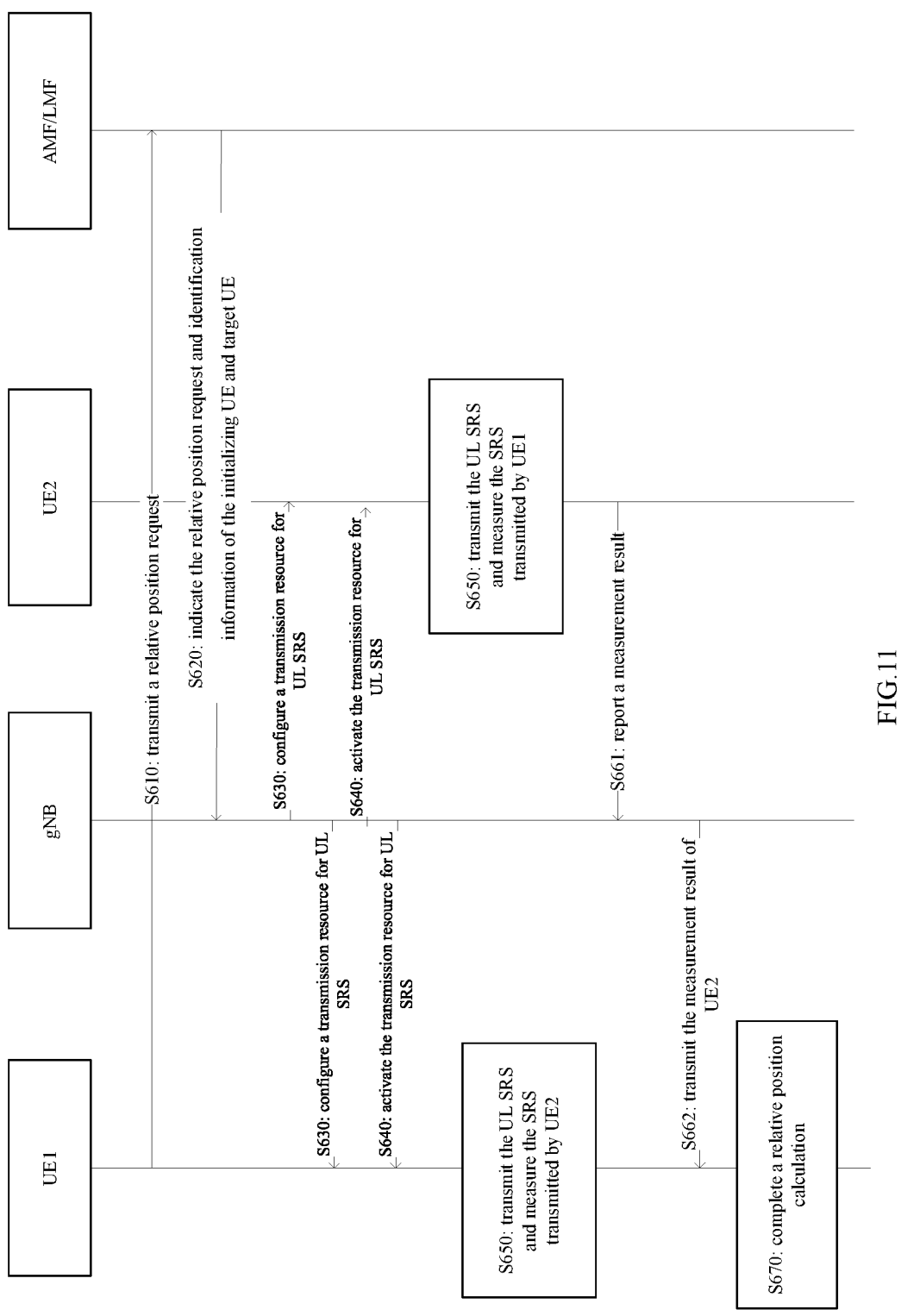
FIG. 11 is a flowchart diagram illustrating a method of positioning between UEs according to an embodiment.

The embodiments of the present disclosure provide a method of positioning between UEs, which may include: when a UE transmits relative positioning indication, a network configures an initializing UE and a target UE to transmit uplink positioning sounding reference signals, the initializing UE and the target UE respectively measure an uplink positioning sounding reference signal transmitted by each other, the target UE transmits a measurement result to the initializing UE via a base station, and the initializing UE implements a relative positioning of the target UE. For example, referring to FIG. 11, at step S610, UE1 transmits the request message to AMF/LMF via a non-access layer (NAS) message to request the relative position of UE2.

At step S620, after receiving the request message from UE1, the AMF or LMF identifies the initializing UE1 and the target UE2 identification and transmits the relative positioning indication to a gNB or transceiver point (TRP).

The relative positioning indication includes: identification of UE1, identification of UE2, and relative position request of UEL to UE2.

At step S630, the gNB configures UL SRS resources to the UE1 and the UE2. The UL SRS resources are for transmitting UL SRS by the UE1 and UE2, and transmitting the SRS configuration of UE1 to UE2 and the SRS configuration of UE2 to UE1; the resource configuration can be implemented by an RRC message.

For example, two pieces of RRC signaling are transmitted to the UE1 and the UE2 respectively, and the resource configuration for transmitting UL SRSs is carried by the two pieces of RRC signaling to the UE1 and UE2 respectively. Or, an RRC signaling is transmitted to the UE1 and UE2, which carries the resource configuration of both UE1 and UE2 to transmit the UL SRSs.

At step S640, the gNB activates UL SRS transmissions of the UE1 and UE2, where an activation message can be a MAC CE.

At step S650, the UE1 measures the UL SRS of UE2 and obtains a measurement result including transmitting and receiving time difference (Rx-Tx time difference) and SRS-RSRP or SRS-RSRQ, where SRS-RSRP or SRS-RSRQ is optional; the UE2 measures the UL SRS of UE1 and obtains a measurement result which includes but is not limited to: transmitting and receiving time difference (Rx-Tx time difference) and SRS-RSRP/RSRQ, where SRS-RSRP/RSRQ is optional.

At step S661, the UE2 transmits the measurement result to the gNB.

At step S662, the gNB transmits the measurement result of UE2 to UE1.

At step S670, the UE1 completes a calculation of the relative position to UE2.

The embodiments of the present disclosure provide a communication device including a processor, a transceiver, a memory, and an executable program stored on the memory and capable of being run by the processor, where the processor, when running the executable program, performs the method of positioning between UEs provided in any of the aforementioned technical solutions as applied to a first UE, a second UE, a base station, or a network elements of core network.

The communication device may be the aforementioned base station or UE or network element of the core network.

The memory may include various types of storage media, which may be non-transitory computer storage media capable of continuing to store information on it in memory after the communication device has been powered down. The communication device includes a base station or user equipment.

The processor may be connected to the memory via a bus and the like, for reading the executable program stored on the memory, and may perform the method of positioning between UEs provided in any of the aforementioned embodiments, for example, as in at least one of FIGS. 2 to 6 or FIG. 11.

The embodiments of the present disclosure provide a computer storage medium, the computer storage medium stores an executable program, when executed by a processor can implement a method for performing positioning between UEs as provided in any of the aforementioned embodiments, for example, as in at least one of FIGS. 2 to 6 or FIG. 11.

Figure 12:
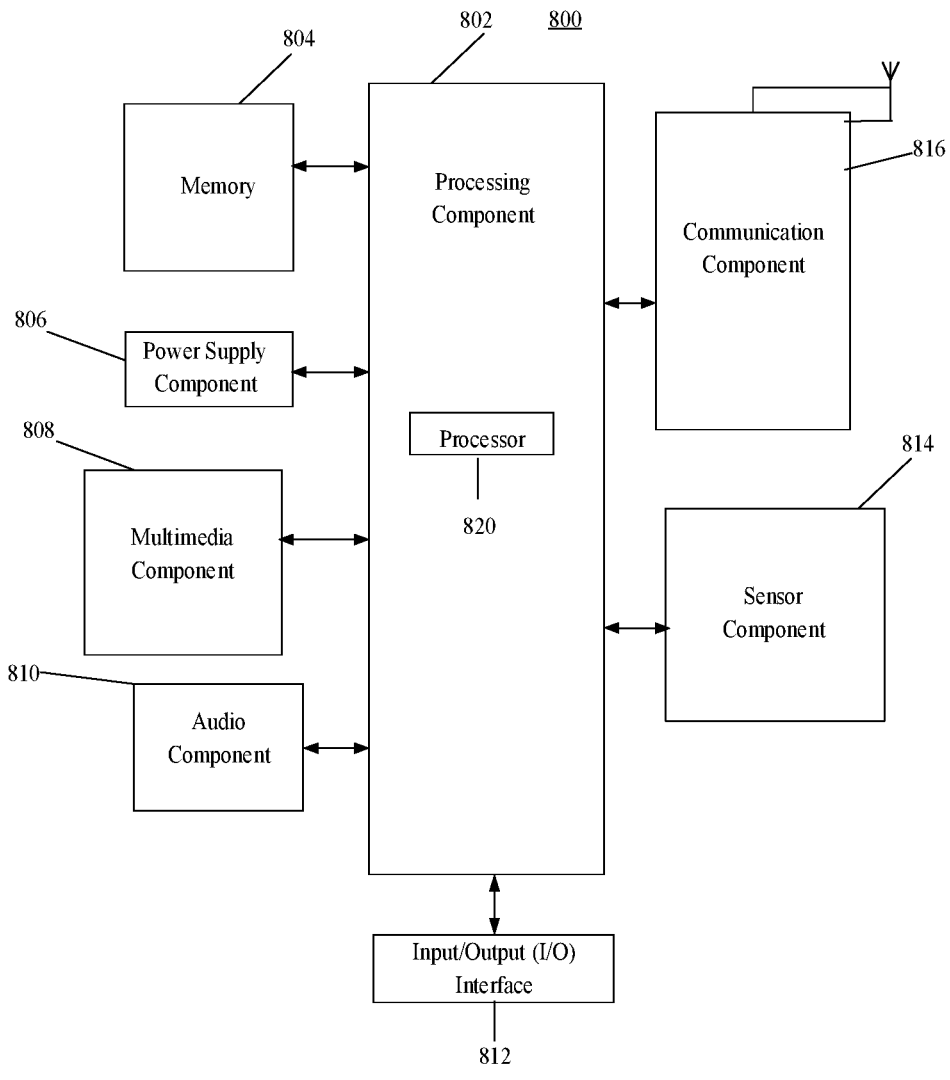
FIG. 12 is a schematic structural diagram illustrating a UE according to an embodiment.

FIG. 12 is a block diagram illustrating a UE 800 according to an embodiment. For example, the UE 800 can be a mobile phone, a computer, a digital broadcast terminal, a message transmitting and receiving device, a gaming console, a tablet device, a medical device, a fitness device, a personal digital assistant, and the like.

As shown in FIG. 12, the UE 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls overall operations of the UE 800, such as operations related to display, a telephone call, data communication, a camera operation, and a record operation. The processing component 802 may include one or more processors 820 for executing instructions to complete all or a part of the steps of the above methods. Further, the processing component 802 may include one or more modules to facilitate interaction between the processing component 802 and another component. For example, the processing component 802 may include a multimedia module to facilitate the interaction between the multimedia component 808 and the processing component 802.

The memory 804 is configured to store different types of data to support operations at the UE 800. Examples of such data include instructions, contact data, phonebook data, messages, pictures, videos, and so on for any application or method that operates on the UE 800. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 806 provides power for different components of the electronic UE 800. The power supply component 806 may include a power management system, one or more power sources, and other components associated with generating, managing, and distributing power for the electronic UE 800.

The multimedia component 808 includes a screen that provides an output interface between the apparatus UE 800 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide, and a gesture on the touch panel. The touch sensor may not only sense a boundary of a touching or sliding movement, but also detect wake-up duration and pressure related to the touching or sliding operation. In some examples, the multimedia component 808 may include a front camera and/or a rear camera. When the UE 800 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 810 is configured to output and/or input an audio signal. For example, the audio component 810 may include a microphone (MIC). When the UE 800 is in an operating mode, such as a call mode, a recording mode, and a speech recognition mode, the microphone is configured to receive an external audio signal. The received audio signal may be further stored in the memory 804 or transmitted via the communication component 816. In some examples, the audio component 810 also includes a loudspeaker for outputting an audio signal.

The I/O interface 812 may provide an interface between the processing component 802 and peripheral interface modules. The above peripheral interface modules may include a keyboard, a click wheel, buttons, and so on. These buttons may include, but are not limited to, a home button, a volume button, a start button, and a lock button.

The sensor component 814 includes one or more sensors to provide state assessments in different aspects of the UE 800. For example, the sensor component 814 may detect an on/off state of the user equipment 800 and a relative location of components. For example, the components are a display and a keypad of the UE 800. The sensor component 814 may also detect a position change of the UE 800 or a component of the UE 800, presence or absence of a touch of a user on the UE 800, an orientation or acceleration/deceleration of the UE 800, and a temperature change of UE 800. The sensor component 814 may include a proximity sensor for detecting the existence of a nearby object without any physical touch. The sensor component 814 may also include an optical sensor, such as a CMOS or CCD image sensor used in an imaging application. In some examples, the sensor component 814 may also include an acceleration sensor, a gyro sensor, a magnetic sensor, a pressure sensor, or a temperature sensor.

The communication component 816 is configured to facilitate wired or wireless communication between the UE 800 and other devices. The UE 800 may access a wireless network based on a communication standard, such as Wi-Fi, 2G, 3G and so on, or a combination of the above. In some embodiments, the communication component 816 may receive a broadcast signal or broadcast-related information from an external broadcast management system via a broadcast channel. In an example, the communication component 816 may also include a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology, and other technologies.

In an example, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the above examples.

In an example, a non-transitory computer readable storage medium including instructions, such as the memory 804 including instructions, is also provided. The above instructions may be executed by the processor 820 of the UE 800 to complete the above methods. For example, the non-transitory computer-readable storage medium may be a ROM, a RAM, a CD-ROM, a magnetic tape, a floppy disc, an optical data storage device, and the like.

Figure 13:
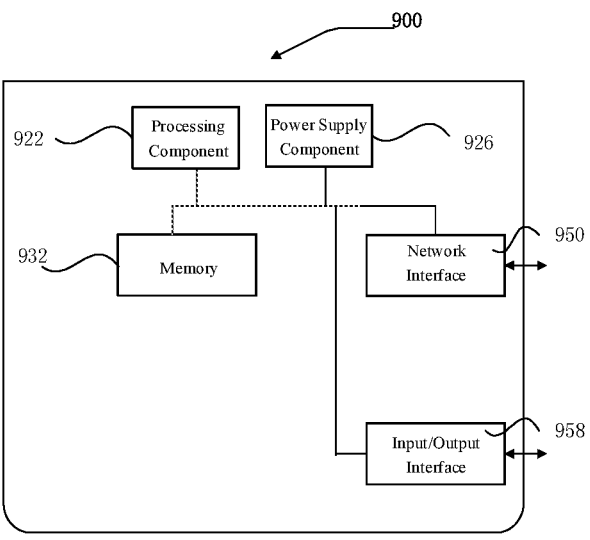
FIG. 13 is a schematic structural diagram illustrating a UE according to an embodiment.

As shown in FIG. 13, a structure of a base station or core network 900 is illustrated in an embodiment of the present disclosure. For example, the base station or core network 900 may be provided as a network device. Referring to FIG. 13, the base station or core network 900 includes a processing component 922, which further includes one or more processors, and a memory resource represented by a memory 932 for storing instructions, such as applications, that can be executed by the processing component 922. The application stored in memory 932 may include one or more modules, and each module corresponds to a set of instructions. In addition, the processing component 922 is configured to execute instructions to perform any of the above methods applied to the base station, for example, as the methods shown in FIGS. 2 to 6.

The base station or core network 900 may also include a power supply component 926 configured to perform power management of the base station 900, a wired or wireless network interface 950 configured to connect the base station 900 to the network, and an input-output (I/O) interface 958. The base station 900 can operate an operating system stored in the memory 932, such as Windows Server™, Mac OS X™, Unix™, Linux™, FreeBSD™ or the like.

Other implementations of the present disclosure will be apparent to those skilled in the art from consideration of the specification and practice of the present disclosure herein.

The present disclosure is intended to cover any variations, uses, modifications, or adaptations of the present disclosure that follow the general principles thereof and include common knowledge or conventional technical means in the art that are not disclosed in the present disclosure. The specification and embodiments herein are intended to be illustrative only, and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A method of positioning between user equipments (UEs), performed by one or more access devices of an access network, comprising:

receiving relative position positioning indication sent by a core network, wherein the relative position positioning indication is for determining a relative position between a first UE and a second UE;

sending resource configuration, based on the relative position positioning indication, to the first UE and the second UE, wherein the resource configuration is for configuring transmission resources for one or more of the first UE and the second UE to transmit or receive one or more Uplink (UL) Sounding Reference Signals (SRSs), and the one or more UL SRSs are for sounding the relative position between the first UE and the second UE, and there is no sidelink communication interface between the first UE and the second UE;

in response to determining that the first UE is configured to transmit a UL SRS, receiving a second measurement result of the UL SRS measured by the second UE, wherein the UL SRS is transmitted by the first UE; and transmitting the second measurement result to the first UE, wherein the second measurement result is for determining the relative position between the first UE and the second UE.

2. The method according to claim 1, wherein the relative position positioning indication comprises identification information of the first UE, identification information of the second UE and a relative position measurement instruction.

3. The method according to claim 2, further comprising:

sending an activation instruction for activating the transmission resources, wherein the transmission resources when activated are for one or more of the first UE and the second UE to transmit or receive the one or more UL SRSs, respectively.

4. The method according to claim 1, wherein the resource configuration comprises one or more of first configuration for the first UE to transmit a UL SRS and second configuration for the second UE to transmit a UL SRS;

sending the resource configuration based on the relative position positioning indication comprises one or more of:

in response to determining that only the first UE is configured to transmit a UL SRS, sending the first configuration to the first UE and the second UE;

in response to determining that only the second UE is configured to transmit a UL SRS, sending the second configuration to the first UE and the second UE; and in response to determining that both the first UE and the second UE are configured to transmit UL SRSs, sending both the first configuration and the second configuration to the first UE and the second UE.

5. A communication device comprising a processor, a transceiver, a memory and an executable program stored on the memory and capable of being executed by the processor, wherein the processor executes the executable program to implement the method according to claim 1.

6. A non-transitory computer storage medium, wherein the computer storage medium storing an executable program when executed by a processor to implement the method according to claim 1.

* * * * *